(12) United States Patent
Kuo et al.

(10) Patent No.: US 9,110,482 B2
(45) Date of Patent: Aug. 18, 2015

(54) SWITCHING REGULATOR CONTROL METHOD

(71) Applicant: Anpec Electronics Corporation, Hsin-Chu (TW)

(72) Inventors: Yueh-Lung Kuo, New Taipei (TW); Chih-Yuan Chen, Hsinchu (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 347 days.

(21) Appl. No.: 13/892,325

(22) Filed: May 13, 2013

(65) Prior Publication Data

US 2014/0232367 A1    Aug. 21, 2014

(30) Foreign Application Priority Data

Feb. 20, 2013  (TW) .............................. 102105904 A

(51) Int. Cl.
*G05F 1/40*      (2006.01)
*G05F 3/08*      (2006.01)

(52) U.S. Cl.
CPC *G05F 3/08* (2013.01); *Y02B 70/126* (2013.01)

(58) Field of Classification Search
CPC ............... G05F 1/00; G05F 1/10; G05F 1/40; G05F 1/461; G05F 1/565; G05F 1/575
USPC ............................ 323/268, 271, 282, 284, 285
See application file for complete search history.

(56) References Cited

U.S. PATENT DOCUMENTS

| | | | |
|---|---|---|---|
| 7,795,846 B2* | 9/2010 | Martin | ............ 323/222 |
| 8,242,765 B2* | 8/2012 | Kunimatsu | ............ 323/285 |
| 2012/0126772 A1 | 5/2012 | Yamakoshi | |
| 2013/0009617 A1 | 1/2013 | Xi | |
| 2014/0266110 A1* | 9/2014 | Yuan et al. | ............ 323/282 |

FOREIGN PATENT DOCUMENTS

| | | |
|---|---|---|
| CN | 102255504 A | 11/2011 |
| TW | 201230652 | 7/2012 |
| TW | 201236330 | 9/2012 |
| TW | 201240309 | 10/2012 |
| TW | 201240514 | 10/2012 |

* cited by examiner

*Primary Examiner* — Matthew Nguyen
(74) *Attorney, Agent, or Firm* — Winston Hsu; Scott Margo

(57) ABSTRACT

A control method for preventing an output voltage of a buck switching regulator from falling when an input voltage of the buck switching regulator falls includes: converting the input voltage into a charging current; determining a duty cycle of the buck switching regulator according to the charging current and the output voltage; and adjusting a switching frequency of a pulse width modulation signal in the buck switching regulator when the input voltage falls to a specific voltage and an off time of the pulse width modulation signal reaches a minimum value, in order to change the duty cycle to prevent the output voltage from falling.

20 Claims, 9 Drawing Sheets

SWITCHING REGULATOR CONTROL METHOD

BACKGROUND OF THE INVENTION

1. Field of the Invention

The present invention relates to a control method and control circuit for a buck switching regulator, and more particularly, to a control method and control circuit capable of increasing an adaptive range for an input voltage of a buck switching regulator.

2. Description of the Prior Art

DC-DC switching regulators are widely applied in various kinds of power supply devices, wherein the main function of the DC-DC switching regulator is to provide stable DC power for various electronic elements. The DC-DC switching regulator can be divided into buck type, boost type and buck-boost type according to relations between the output voltage and input voltage. A well-controlled switching regulator can retain high power conversion efficiency and provide a stable output voltage in different situations such as different input voltages or different loading currents.

The buck switching regulator is a switching regulator type where the output voltage is less than the input voltage. There are various control methods for the conventional buck switching regulator. One common control method adjusts the duty cycle of a pulse width modulation (PWM) signal to stabilize the output voltage. According to this control method, the output terminal and the input terminal of the buck switching regulator should comply with the law of conservation of energy. Therefore, the duty cycle may be equal to a ratio of the output voltage to the input voltage of the buck switching regulator; the relations between a duty cycle D, an output voltage $V_{out}$ and an input voltage $V_{in}$ can be derived as follows:

$$D = V_{out}/V_{in}. \qquad (1)$$

In an ideal case, the input voltage $V_{in}$ of the buck switching regulator may fall to a voltage level equal to the output voltage $V_{out}$. In such a condition, the duty cycle D should be equal to 1, such that the power can be transmitted from the input terminal to the output terminal completely, i.e. the power conversion efficiency is 100%. In practice, when the buck switching regulator is operated, this cannot be achieved because: even if the power transistor is extremely large, a drop out may still be unavoidable; and when the control circuit of the buck switching regulator is operated, the pulse width modulation signal cannot be turned on permanently, so that at least a small off time has to be utilized for buffering. During the off time of the pulse width modulation signal, partial detecting devices may perform over-current detection or other operations. When the input voltage $V_{in}$ is gradually reduced, the on time of the pulse width modulation signal may increase and the off time will be reduced. If the off time reaches a minimum value while the input voltage $V_{in}$ still keeps falling, the buck switching regulator may not transmit enough power to the output terminal, such that the output voltage $V_{out}$ has to fall in accordance with the input voltage $V_{in}$, in order to maintain the system balance. As a result, when the input voltage $V_{in}$ falls to a lower voltage level, the buck switching regulator may not output the stable output voltage $V_{out}$ continuously. Thus, there is a need to provide a method which allows the buck switching regulator to output a stable output voltage even when the input voltage falls to a lower voltage level, in order to increase an adaptive range for the input voltage of the buck switching regulator.

SUMMARY OF THE INVENTION

It is therefore an objective of the present invention to provide a control method and control circuit for the buck switching regulator, which is capable of changing a duty cycle of a pulse width modulation signal by adjusting a switching frequency of the pulse width modulation signal in the buck switching regulator when the input voltage of the buck switching regulator falls to approximately the output voltage. The control method and control circuit can prevent the output voltage from falling, such that the buck switching regulator can still provide a stable output voltage even with a low input voltage, in order to increase an adaptive range for the input voltage of the buck switching regulator.

The present invention discloses a control method for preventing an output voltage of a buck switching regulator from falling when an input voltage of the buck switching regulator falls. The control method comprises converting the input voltage into a charging current; determining a duty cycle of the buck switching regulator according to the charging current and the output voltage; and adjusting a switching frequency of a pulse width modulation signal in the buck switching regulator when the input voltage falls to a specific voltage and an off time of the pulse width modulation signal reaches a minimum value, in order to change the duty cycle to prevent the output voltage from falling.

The present invention further discloses a control circuit for a buck switching regulator. The control circuit comprises a voltage-to-current converter, for converting an input voltage of the buck switching regulator into a charging current; a current output device, coupled to the voltage-to-current converter, for outputting the charging current; a capacitor, coupled to the current output device, for storing the charging current; a switch, coupled to the capacitor, for discharging the capacitor; a comparing device, coupled to the voltage-to-current converter, for determining a duty cycle of the buck switching regulator according to the charging current and an output voltage of the buck switching regulator; and a duty cycle adjusting device, for adjusting a switching frequency of a pulse width modulation signal in the buck switching regulator when the input voltage falls to a specific voltage and an off time of the pulse width modulation signal reaches a minimum value, in order to change the duty cycle to prevent the output voltage from falling.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
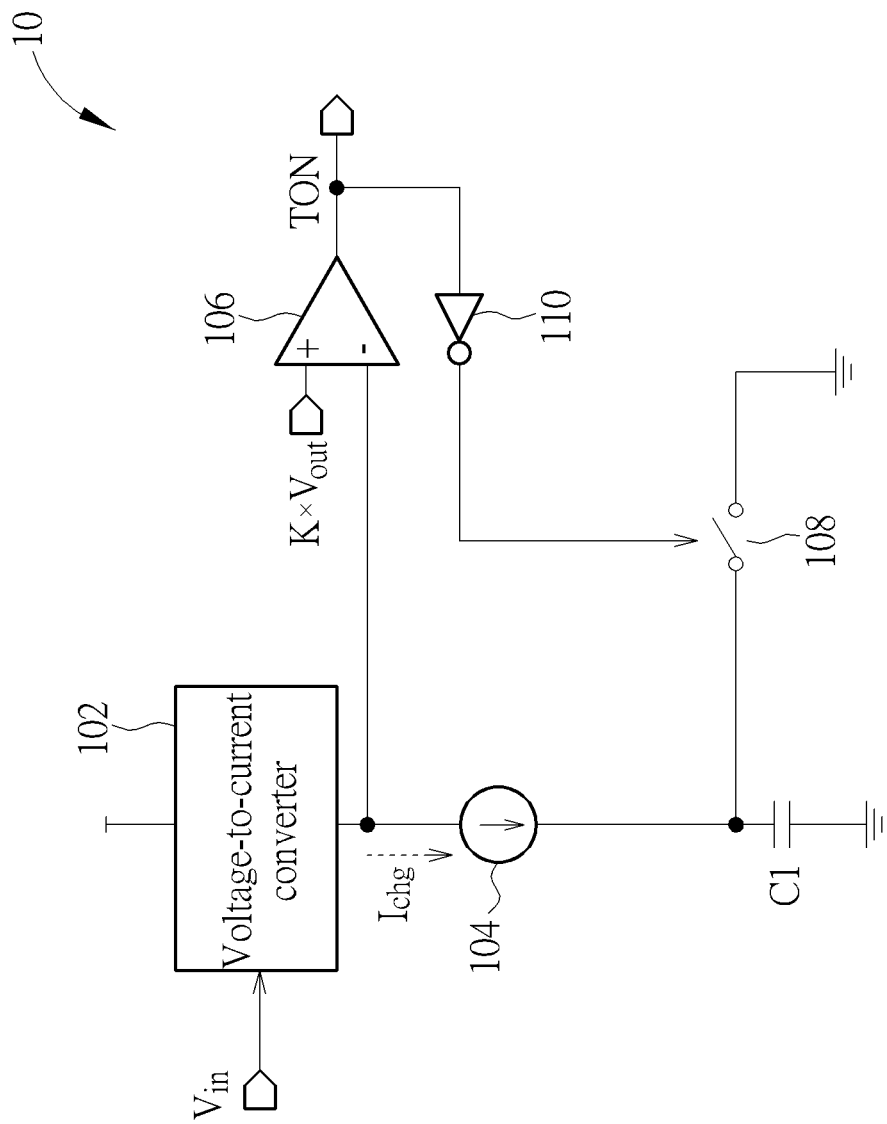
FIG. 1 is a schematic diagram of a control circuit of a general buck switching regulator.

Please refer to FIG. 1, which is a schematic diagram of a control circuit 10 of a general buck switching regulator. As shown in FIG. 1, the control circuit 10 is utilized for controlling a duty cycle D of a pulse width modulation signal TON in the buck switching regulator. The control circuit 10 includes a voltage-to-current converter 102, a charging current source 104, a comparing device 106, a switch 108 and a capacitor C1. The voltage-to-current converter 102 receives an input voltage $V_{in}$ of the buck switching regulator, and converts the input voltage $V_{in}$ into a charging current $I_{chg}$. The charging current source 104, coupled to the voltage-to-current converter 102, is capable of charging the capacitor C1 when the switch 108 is turned off. The comparing device 106, coupled to the voltage-to-current converter 102, is utilized for generating the pulse width modulation signal TON according to the charging current $I_{chg}$ and an output voltage $V_{out}$ of the buck switching regulator. The pulse width modulation signal TON is a periodic signal, which can control the power transistors of the buck switching regulator to be turned on or off periodically, in order to satisfy load requirements in the output terminal of the buck switching regulator. The capacitor C1 is utilized for storing the charging current $I_{chg}$, which facilitates the adjustments and controls of the duty cycle. The pulse width modulation signal TON further controls the switch 108 to be turned on and off via an inverter 110, in order to trigger the switch 108 to discharge the capacitor C1.

In each switching cycle, when the duty cycle D of the pulse width modulation signal TON ends, the switch 108 is turned on to discharge the capacitor C1. Until the buck switching regulator detects that the output voltage $V_{out}$ is too low and generates the next switching cycle, the switch 108 remains in the turned-on status. After the control circuit 10 receives the input voltage $V_{in}$, the voltage-to-current converter 102 converts the input voltage $V_{in}$ into the charging current $I_{chg}$, and the charging current source 104 outputs the charging current $I_{chg}$ to the capacitor C1, in order to charge the capacitor C1. The voltage accumulated in the capacitor C1 is received by the negative input terminal of the comparing device 106, and the positive input terminal of the comparing device 106 receives the output voltage $V_{out}$, where the comparing device 106 compares the output voltage $V_{out}$ after being multiplied by a parameter K with the voltage accumulated in the capacitor C1, in order to output the pulse width modulation signal TON. When the voltage of the capacitor C1 rises and exceeds a voltage level $K*V_{out}$, the pulse width modulation signal TON is turned off, which triggers the switch 108 to be turned on via the inverter 110, in order to discharge the capacitor C1. Until the buck switching regulator detects that the output voltage $V_{out}$ is too low and generates the next switching cycle, the switch 108 remains in the turned-on status. When the buck switching regulator system generates a new switching cycle, the switch 108 is turned off and the pulse width modulation signal TON will be turned on again, in order to perform the next switching cycle. In some embodiments, the positive input terminal of the comparing device 106 may also receive the voltage accumulated in the capacitor C1, and the negative input terminal of the comparing device 106 may receive the output voltage $V_{out}$. As a result, the pulse width modulation signal TON can directly control the switch 108 without the use of the inverter 110.

As mentioned above, since the output terminal and the input terminal of the buck switching regulator have to comply with the law of conservation of energy, a relation between the duty cycle D, the output voltage $V_{out}$ and the input voltage $V_{in}$ is expressed as shown in equation (1). In detail, the duty cycle D of the pulse width modulation signal TON can further be defined as follows:

$$V_{out}/V_{in}=D=T_{on}/T_s. \quad (2)$$

In equation (2), $T_{on}$ denotes an on time of the pulse width modulation signal TON, and $T_s$ denotes a switching cycle of the pulse width modulation signal TON (i.e. $T_{on}/T_s$ is equal to the duty cycle D). More specifically, $T_s$ can be derived by:

$$T_s=T_{on}+T_{off}. \quad (3)$$

In equation (3), $T_{off}$ denotes an off time of the pulse width modulation signal TON. The off time $T_{off}$ can be considered as a time after the on time $T_{on}$ ends until the buck switching regulator system detects that power in the output terminal is insufficient and generates the next switching cycle. In order to stabilize the voltage, when the input voltage $V_{in}$ falls gradually, a well-controlled buck switching regulator has to maintain a fixed output voltage $V_{out}$, such that $V_{out}/V_{in}$ rises gradually and the duty cycle D will increase accordingly. At this moment, since each switching cycle $T_s$ is fixed, the on time $T_{on}$ has to increase gradually and the off time $T_{off}$ has to fall gradually. As mentioned above, in each switching of the pulse width modulation signal TON, there should be at least a small off time $T_{off}$ remaining for buffering. When the input voltage $V_{in}$ falls to a lower value such that the off time $T_{off}$ of the pulse width modulation signal TON reaches a minimum value $T_{off\_min}$, the duty cycle D cannot rise more, and the output voltage $V_{out}$ has to fall, in order to achieve the balance of the above equations.

In the control circuit 10 of the buck switching regulator, the output voltage $V_{out}$, the charging current $I_{chg}$, the capacitor C1 and the on time $T_{on}$ possess the following relations (the parameter K is omitted for simplicity):

$$I_{chg}*T_{on}=C1*V_{out} \quad (4)$$

$$T_{on}=(C1*V_{out})/I_{chg}. \quad (5)$$

In order to prevent the output voltage $V_{out}$ from falling, the on time $T_{on}$ has to increase based on the premise that the off time $T_{off}$ should not be reduced. In other words, the duty cycle D may be adjusted by reducing a switching frequency $F_s$ (i.e. increasing the switching cycle $T_s$, where the switching frequency $F_s$ is a reciprocal of the switching cycle $T_s$). More specifically, when the input voltage $V_{in}$ falls to approximately the output voltage $V_{out}$, the off time $T_{off}$ of the pulse width modulation signal TON reaches the minimum value, such that the control circuit 10 has to use a duty cycle adjusting device to increase the on time $T_{on}$. At this moment, the switching cycle $T_s$ also increases (i.e. the switching frequency $F_s$ is reduced), which increases the duty cycle D as well, in order to prevent the output voltage $V_{out}$ from falling.

Figure 2:
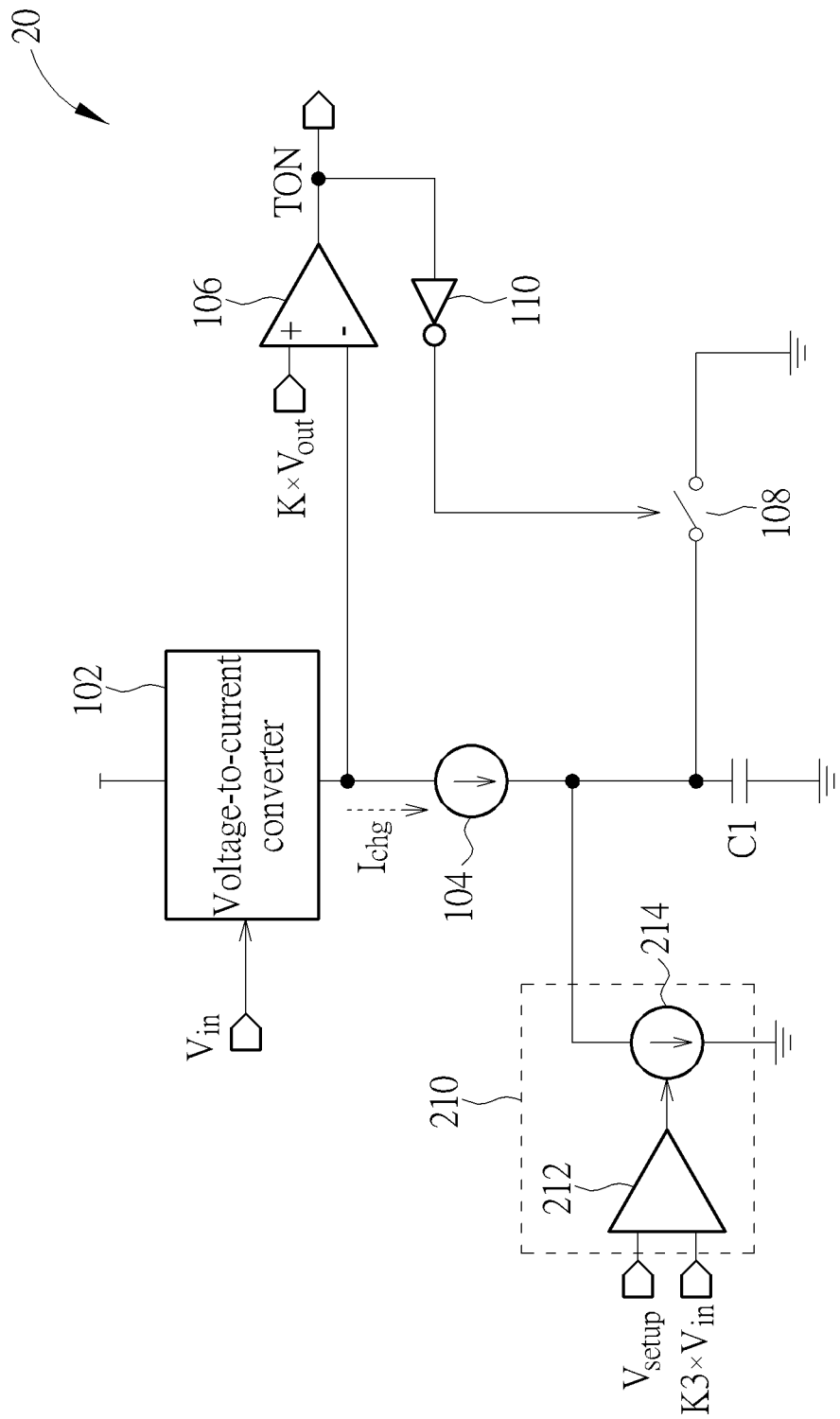
FIG. 2 is a schematic diagram of a control circuit of a buck switching regulator according to an embodiment of the present invention.

According to equations (4) and (5), if the on time $T_{on}$ needs to increase, one of the most intuitive methods is reducing the charging current $I_{chg}$. Please refer to FIG. 2, which is a schematic diagram of a control circuit 20 of a buck switching regulator according to an embodiment of the present invention. As shown in FIG. 2, the structure of the control circuit 20 is similar to that of the control circuit 10 shown in FIG. 1; hence, elements and signals with similar functions are denoted by the same symbols. The main difference between the control circuit 20 and the control circuit 10 is that the control circuit 20 further includes a duty cycle adjusting device 210, which is utilized for adjusting the duty cycle D of the buck switching regulator, in order to prevent the output voltage $V_{out}$ from falling. When the off time $T_{off}$ of the switch 108 reaches the minimum value $T_{off\_min}$, the duty cycle adjusting device 210 may increase the on time $T_{on}$, such that the switching cycle $T_s$ (the on time $T_{on}$ plus the off time $T_{off}$) may also increase, which reduces the switching frequency $F_s$. This will change the duty cycle of the buck switching regulator to prevent the output voltage $V_{out}$ from falling. Therefore, the duty cycle D of the pulse width modulation signal TON can be adjusted.

The duty cycle adjusting device 210 includes a comparing device 212 and a current source 214. Two input terminals of the comparing device 212 respectively receive a setting voltage $V_{setup}$ and the input voltage $V_{in}$ multiplied by a specific parameter K3. The comparing device 212 is utilized for determining the input voltage $V_{in}$, such that the duty cycle adjusting functions (i.e. the switching frequency $F_s$ adjusting functions) of the duty cycle adjusting device 210 may start to be operated when the input voltage $V_{in}$ multiplied by the specific parameter K3 is lower than the setting voltage $V_{setup}$. The current source 214 is coupled to the comparing device 212 and the charging current source 104, and is controlled by the output terminal of the comparing device 212. When the comparing device 212 determines that the input voltage $V_{in}$ multiplied by the specific parameter K3 is higher than the setting voltage $V_{setup}$, the duty cycle adjusting device 210 controls the charging current source 104 to be turned off. At this moment, since the input voltage $V_{in}$ is higher, the buck switching regulator can operate normally without additionally adjusting the duty cycle D. When the comparing device 212 determines that the input voltage $V_{in}$ multiplied by the specific parameter K3 is lower than the setting voltage $V_{setup}$, the duty cycle adjusting device 210 controls the current source 214 to start drawing partial currents from the charging current source 104, such that the charging current $I_{chg}$ flowing to the output terminal will fall, in order to increase the on time $T_{on}$. As a result, when the input voltage $V_{in}$ falls to approximately the output voltage $V_{out}$, the duty cycle adjusting device 210 can prevent the output voltage $V_{out}$ from falling, such that the buck switching regulator can still provide the stable output voltage $V_{out}$ under the low input voltage $V_{in}$. This increases the adaptive range for the input voltage $V_{in}$ of the buck switching regulator.

Figure 3:
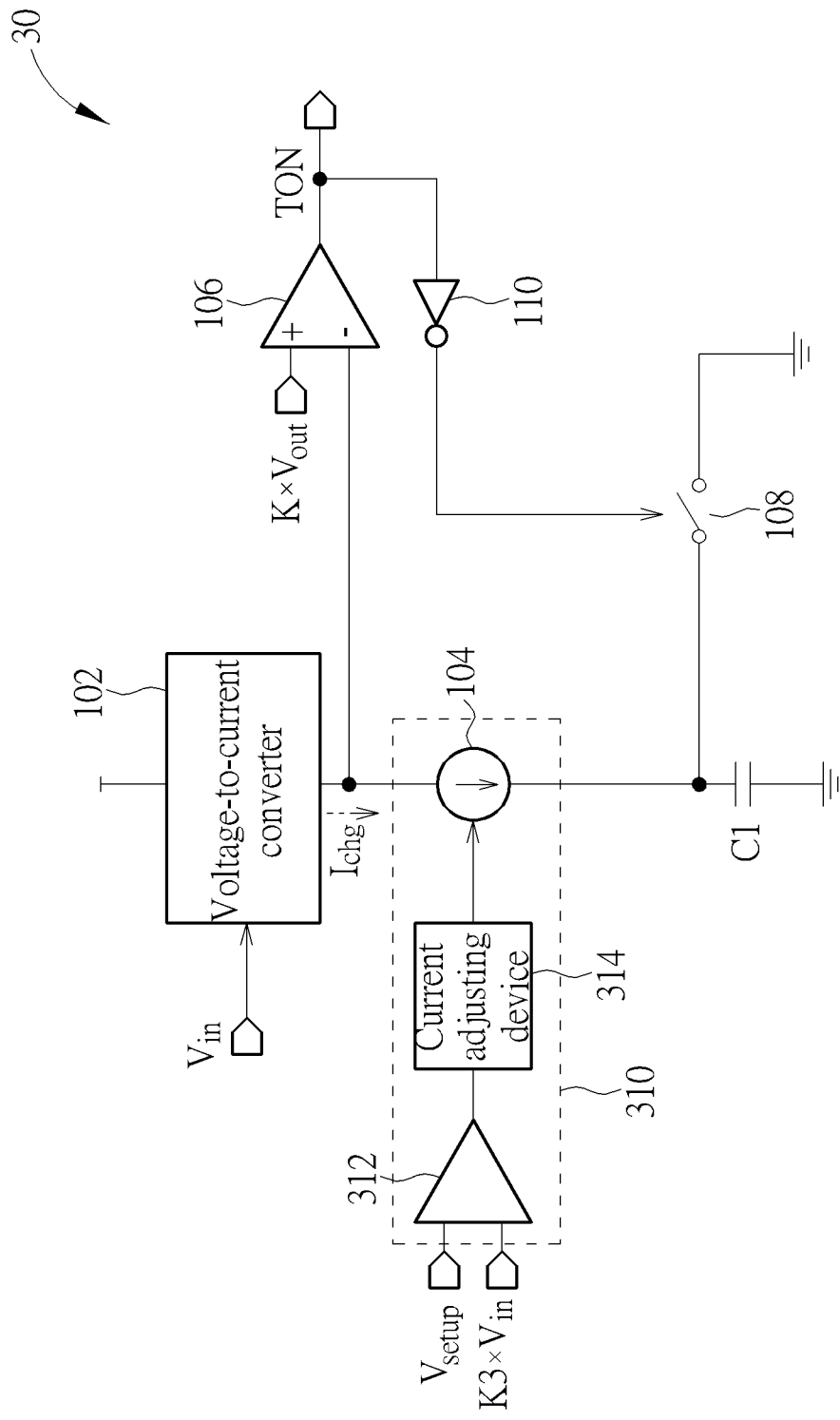
FIG. 3 is a schematic diagram of a control circuit of a buck switching regulator according to another embodiment of the present invention.

Please note that the above embodiment is only one of the feasible embodiments for the duty cycle adjusting device. Another embodiment is illustrated in FIG. 3, which is a schematic diagram of a control circuit 30 of another buck switching regulator. As shown in FIG. 3, the structure of the control circuit 30 is similar to that of the control circuit 20 as shown in FIG. 2; hence, elements and signals with similar functions are denoted by the same symbols. The main difference between the control circuit 30 and the control circuit 20 is that a duty cycle adjusting device 310 of the control circuit 30 directly includes the charging current source 104, and the charging current source 104 is a variable current source. Therefore, when the comparing device 312 determines that the input voltage $V_{in}$ multiplied by the specific parameter K3 is lower than the setting voltage $V_{setup}$, the duty cycle adjusting device 310 utilizes a current adjusting device 314 for controlling the charging current source 104 to output the lower charging current $I_{chg}$, in order to increase the on time $T_{on}$. As a result, when the input voltage $V_{in}$ falls to approximately the output voltage $V_{out}$, the duty cycle adjusting device 310 can prevent the output voltage $V_{out}$ from falling, such that the buck switching regulator can still provide the stable output voltage $V_{out}$ under the low input voltage $V_{in}$. This increases the adaptive range for the input voltage $V_{in}$ of the buck switching regulator.

In some embodiments of the present invention, the buck switching regulator detects the input voltage $V_{in}$ and adjusts the duty cycle D by increasing the on time $T_{on}$ of the pulse width modulation signal TON when the off time $T_{off}$ reaches the minimum value $T_{off\_min}$ in order to prevent the output voltage $V_{out}$ from falling in accordance with the input voltage $V_{in}$. Those skilled in the art can make modifications and alterations accordingly. For example, among various control methods for the buck switching regulator, as long as the control method can detect the input voltage and the output voltage to generate a pulse width modulation signal to be provided as a control signal in the output terminal, this control method can utilize the duty cycle adjusting methods provided by the present invention. The duty cycle adjusting device can adjust the duty cycle of the buck switching regulator by using other methods, and is not limited to the abovementioned methods of directly changing the charging current $I_{chg}$.

Figure 4:
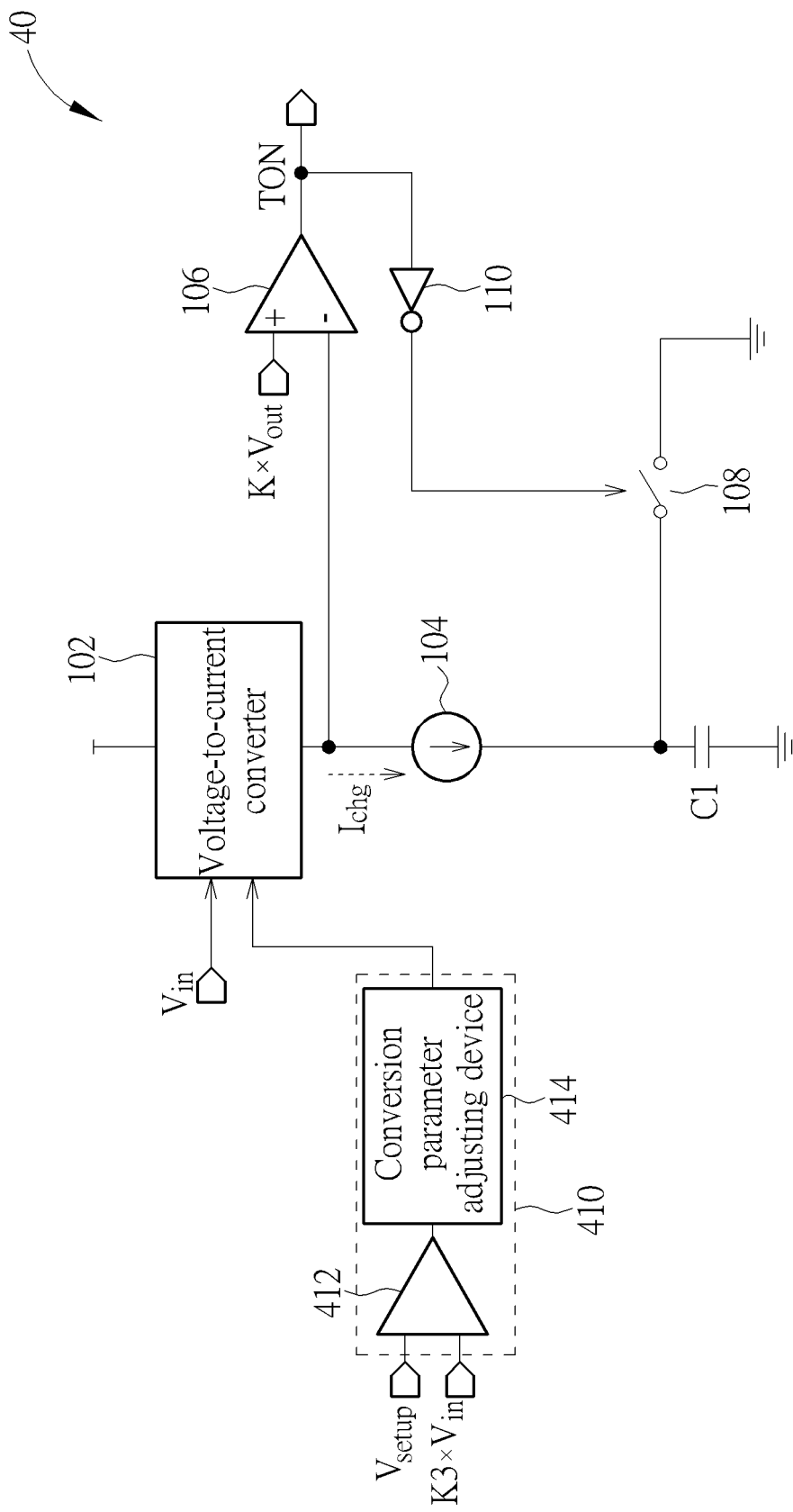
FIG. 4 is a schematic diagram of a control circuit of a buck switching regulator according to another embodiment of the present invention.

The following embodiment discloses a method for adjusting the duty cycle which does not change the charging current $I_{chg}$ directly. Please refer to FIG. 4, which is a schematic diagram of a control circuit 40 of another buck switching regulator. As shown in FIG. 4, the structure of the control circuit 40 is similar to that of the control circuit 20 as shown in FIG. 2; hence, elements and signals with similar functions are denoted by the same symbols. The main difference between the control circuit 40 and the control circuits 20, 30 is that a duty cycle adjusting device 410 of the control circuit 40 adjusts the duty cycle D by controlling the voltage-to-current converter 102. As mentioned above, the voltage-to-current converter 102 is utilized for converting the input voltage $V_{in}$ into the charging current $I_{chg}$. Therefore, according to the conversion performed by the voltage-to-current converter 102, the charging current $I_{chg}$ and the input voltage $V_{in}$ possess the following relation:

$$I_{chg}=V_{in}*Gm. \quad (6)$$

In equation (6), Gm denotes a conversion parameter of the voltage-to-current converter 102. Equation (6) can be substituted into equation (5) to obtain:

$$T_{on}=(C1*V_{out})/(V_{in}*Gm). \quad (7)$$

Equation (2) can then be substituted into equation (7) and the following equation, after being simplified, can be obtained:

$$T_s=C1/Gm. \quad (8)$$

As mentioned above, the main objective of the duty cycle adjusting device is to increase the on time $T_{on}$. When the input voltage $V_{in}$ is too low and close to the output voltage $V_{out}$, the off time $T_{off}$ reaches the minimum value $T_{off\_min}$. At this moment, the operation of increasing the on time $T_{on}$ is equal to increasing the switching cycle $T_s$ while the off time $T_{off}$ remains in the minimum value $T_{off\_min}$. As a result, according to equation (8), by reducing the conversion parameter Gm with the duty cycle adjusting device 410, the switching cycle $T_s$ can be increased, and the on time $T_{on}$ and the duty cycle D can both rise when the off time $T_{off}$ remains in the specific minimum value $T_{off\_min}$. This adjusting method may also be considered as reducing the conversion parameter Gm to reduce the charging current $I_{chg}$ according to equation (6); then, according to the above illustrations, the on time $T_{on}$ will rise due to the reduction of the charging current $I_{chg}$.

The duty cycle adjusting device 410 includes a comparing device 412 and a conversion parameter adjusting device 414. The operations of the comparing device 412 are the same as those of the comparing device 212 and the comparing device 312. Those comparing devices receive both the setting voltage $V_{setup}$ and the input voltage $V_{in}$ multiplied by the specific parameter K3. When the comparing device 412 determines that the input voltage $V_{in}$ multiplied by the specific parameter K3 is higher than the setting voltage $V_{setup}$ the duty cycle adjusting device 410 controls the conversion parameter adjusting device 414 to be turned off. At this moment, since the input voltage $V_{in}$ is higher, the buck switching regulator can operate normally without additionally adjusting the duty cycle D. When the comparing device 412 determines that the input voltage $V_{in}$ multiplied by the specific parameter K3 is lower than the setting voltage $V_{setup}$ the duty cycle adjusting device 410 controls the conversion parameter adjusting device 414 to start operating to reduce the conversion parameter Gm. At this moment, the charging current $I_{chg}$ may also fall accordingly, and the on time $T_{on}$ and the duty cycle D both rise. As a result, when the input voltage $V_{in}$ falls to approximately the output voltage $V_{out}$, the duty cycle adjusting device 410 can prevent the output voltage $V_{out}$ from falling, such that the buck switching regulator can still provide the stable output voltage $V_{out}$ under the low input voltage $V_{in}$. This increases the adaptive range for the input voltage $V_{in}$ of the buck switching regulator.

Figure 5:
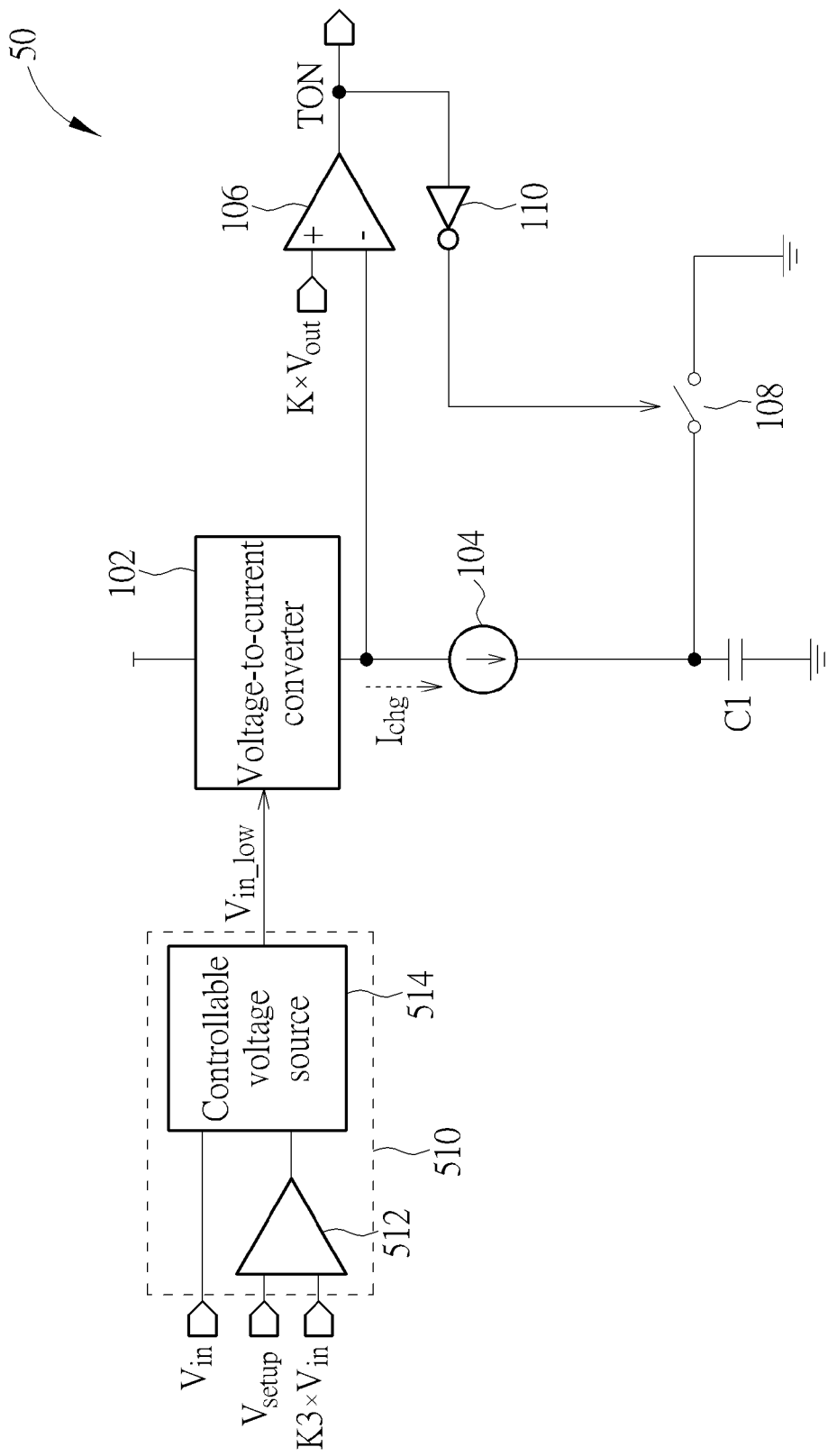
FIG. 5 is a schematic diagram of a control circuit of a buck switching regulator according to another embodiment of the present invention.

Please refer to FIG. 5, which is a schematic diagram of a control circuit 50 of another buck switching regulator according to an embodiment of the present invention. As shown in FIG. 5, the structure of the control circuit 50 is similar to that of the control circuit 20 as shown in FIG. 2; hence, elements and signals with similar functions are denoted by the same symbols. The main difference between the control circuit 50 and the control circuits 20, 30 and 40 is that a duty cycle adjusting device 510 of the control circuit 50 is coupled between the voltage-to-current converter 102 and an input voltage source of the buck switching regulator. In other words, in the voltage-to-current converter 102, the input terminal which originally receives the input voltage $V_{in}$ is connected to the duty cycle adjusting device 510 instead, such that the input voltage $V_{in}$ is transmitted to the voltage-to-current converter 102 after passing through the duty cycle adjusting device 510. The duty cycle adjusting device 510 includes a comparing device 512 and a controllable voltage source 514. For the operation of the duty cycle adjusting device 510, when the comparing device 512 determines that the input voltage $V_{in}$ multiplied by the specific parameter K3 is higher than the setting voltage $V_{setup}$, the duty cycle adjusting device 510 controls the controllable voltage source 514 to be turned off. At this moment, since the input voltage $V_{in}$ is higher, the buck switching regulator can operate normally without additionally adjusting the duty cycle D. Therefore, the duty cycle adjusting device 510 can directly transmit the input voltage $V_{in}$ to the voltage-to-current converter 102.

When the comparing device 512 determines that the input voltage $V_{in}$ multiplied by the specific parameter K3 is lower than the setting voltage $V_{setup}$, the duty cycle adjusting device 510 controls the controllable voltage source 514 to start operating to convert the input voltage $V_{in}$ into a lower voltage $V_{in\_low}$ to be transmitted to the voltage-to-current converter 102. According to equation (6), the reduction of the input voltage $V_{in}$ may reduce the charging current $I_{chg}$, and the on time $T_{on}$ will rise due to the reduction of the charging current $I_{chg}$ according to the above illustrations. As a result, when the input voltage $V_{in}$ falls to approximately the output voltage $V_{out}$, the duty cycle adjusting device 510 can prevent the output voltage $V_{out}$ from falling, such that the buck switching regulator can still provide the stable output voltage $V_{out}$ under the low input voltage $V_{in}$. This increases the adaptive range for the input voltage $V_{in}$ of the buck switching regulator.

Figure 6:
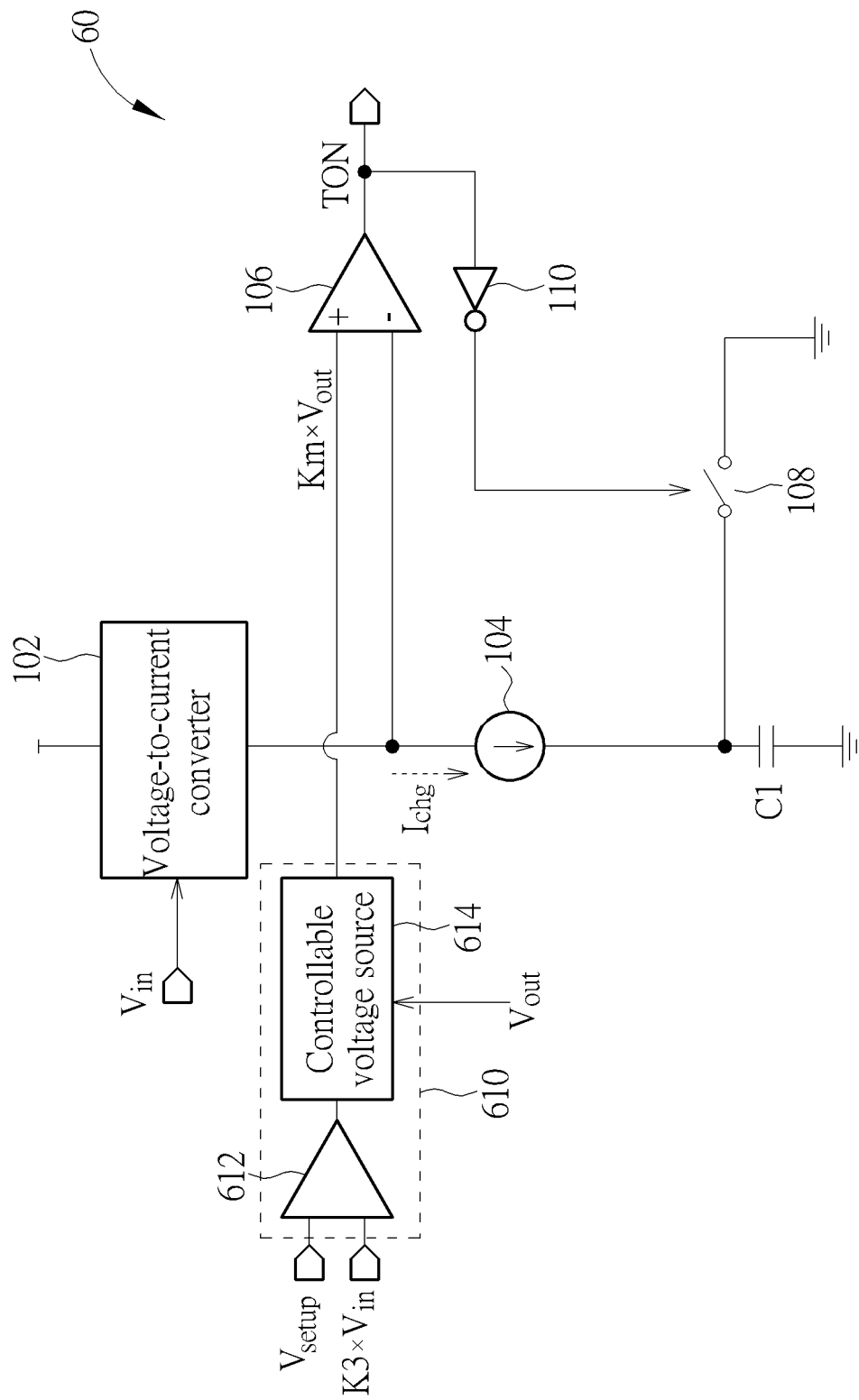
FIG. 6 is a schematic diagram of a control circuit of a buck switching regulator according to another embodiment of the present invention.

Please refer to FIG. 6, which is a schematic diagram of a control circuit 60 of another buck switching regulator according to an embodiment of the present invention. As shown in FIG. 6, the structure of the control circuit 60 is similar to that of the control circuit 20 as shown in FIG. 2; hence, elements and signals with similar functions are denoted by the same symbols. The main difference between the control circuit 60 and the control circuits 20, 30, 40 and 50 is that a duty cycle adjusting device 610 of the control circuit 60 is coupled between the comparing device 106 and the output terminal of the buck switching regulator. In other words, in the comparing device 106, the input terminal which originally receives the output voltage $V_{out}$ is connected to the duty cycle adjusting device 610 instead, such that the output voltage $V_{out}$ is transmitted to the comparing device 106 after passing through the duty cycle adjusting device 610. The duty cycle adjusting device 610 includes a comparing device 612 and a controllable voltage source 614. For the operation of the duty cycle adjusting device 610, when the comparing device 612 determines that the input voltage $V_{in}$ multiplied by the specific parameter K3 is higher than the setting voltage $V_{setup}$, the duty cycle adjusting device 610 controls the controllable voltage source 614 to be turned off. At this moment, since the input voltage $V_{in}$ is higher, the buck switching regulator can operate normally without additionally adjusting the duty cycle. Therefore, the duty cycle adjusting device 610 can directly transmit the output voltage $V_{out}$ multiplied by the parameter K to the comparing device 106. When the comparing device 612 determines that the input voltage $V_{in}$ multiplied by the specific parameter K3 is lower than the setting voltage $V_{setup}$ the duty cycle adjusting device 610 controls the controllable voltage source 614 to start operating to multiply the output voltage $V_{out}$ by a higher parameter Km, in order to convert the output voltage $V_{out}$ into a higher voltage Km*$V_{out}$ to be transmitted to the comparing device 612. According to equation (5), when the capacitor C1 and the charging current $I_{chg}$ is fixed, the increase of the output voltage $V_{out}$ may increase the on time $T_{on}$. As a result, when the input voltage $V_{in}$ falls to approximately the output voltage $V_{out}$, the duty cycle adjusting device 610 can prevent the output voltage $V_{out}$ from falling, such that the buck switching regulator can still provide the stable output voltage $V_{out}$ under the low input voltage $V_{in}$. This increases the adaptive range for the input voltage $V_{in}$ of the buck switching regulator.

Figure 7A:
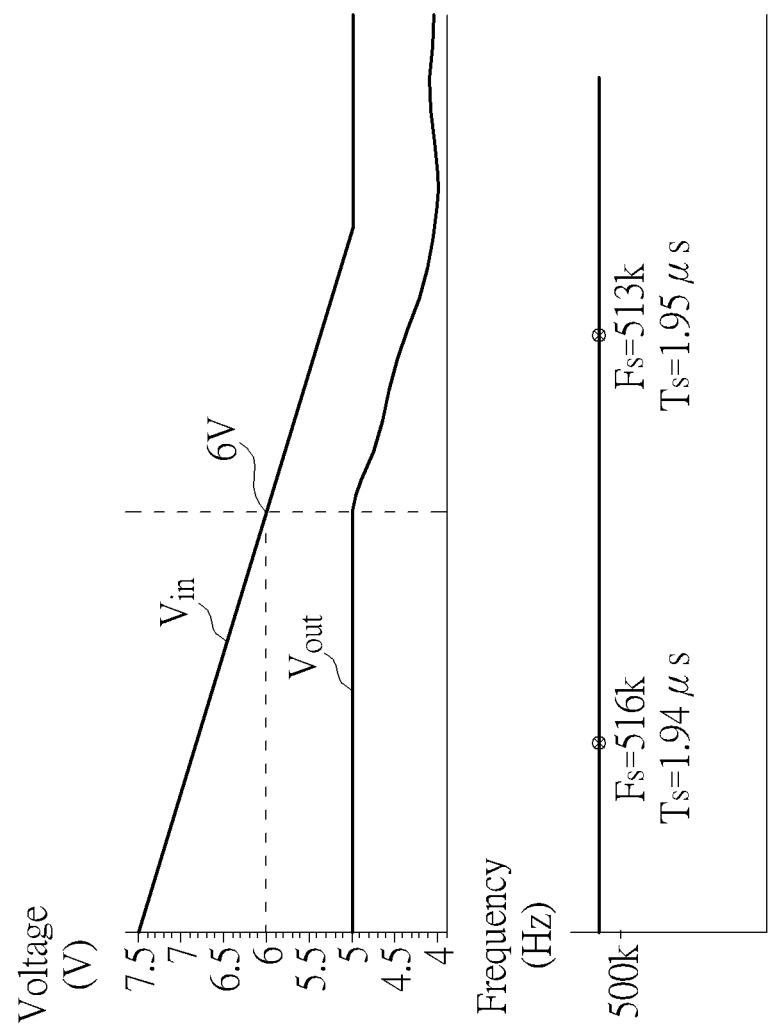
FIG. 7A is a waveform diagram of the output voltage wherein the input voltage is reduced while the duty cycle adjusting device is not operated according to an embodiment of the present invention.
Figure 7B:
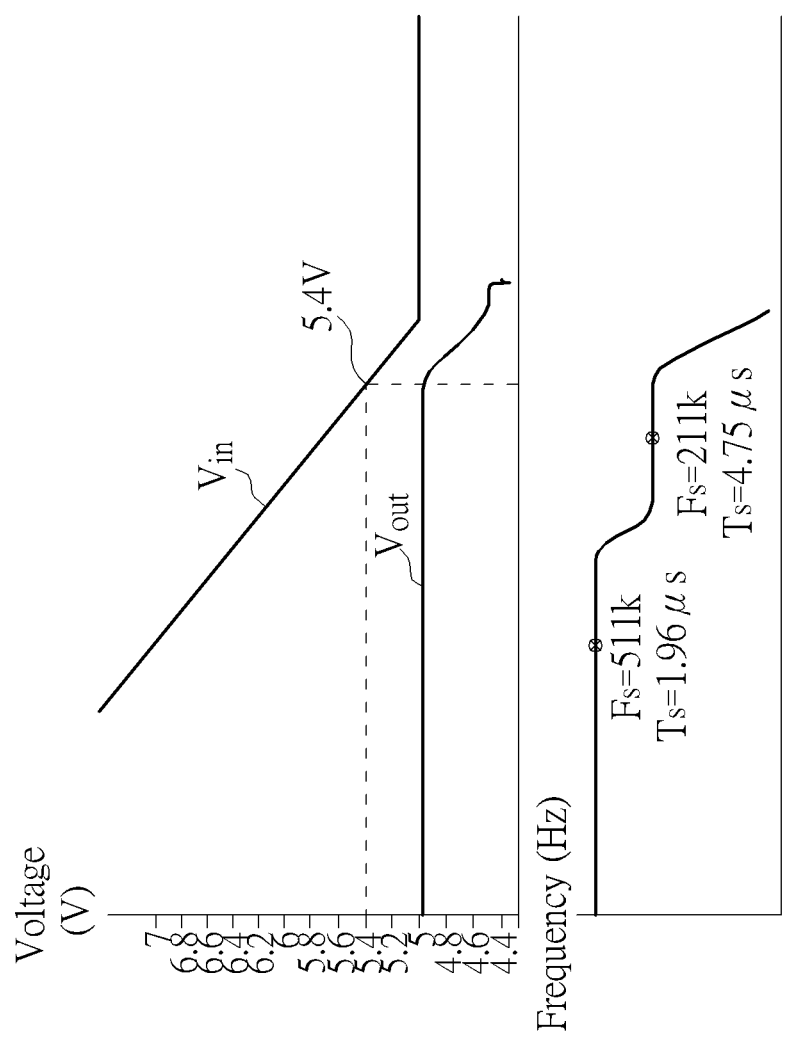
FIG. 7B is a waveform diagram of the output voltage wherein the input voltage is reduced while the duty cycle adjusting device is activated according to an embodiment of the present invention.
Figure 7C:
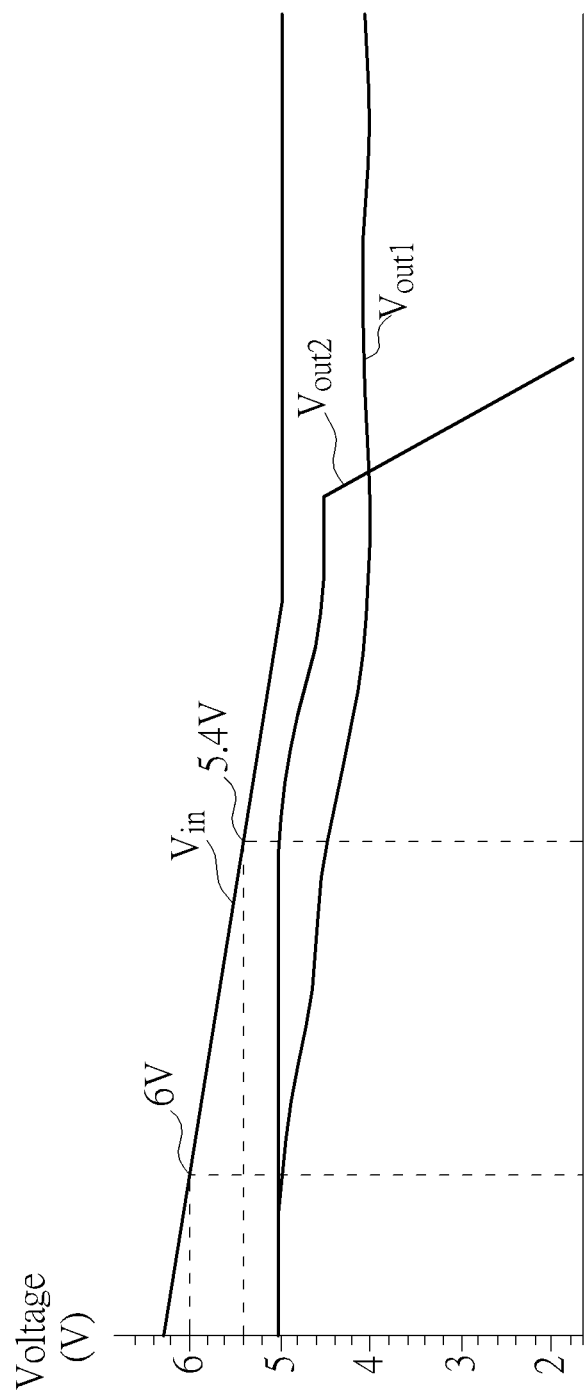
FIG. 7C is a waveform diagram of comparing an output voltage of the buck switching regulator without the duty cycle adjusting device with an output voltage of the buck switching regulator having the duty cycle adjusting device according to an embodiment of the present invention.

The effects of the buck switching regulator providing the stable output voltage $V_{out}$ even in the low input voltage $V_{in}$ are illustrated in FIGS. 7A to 7C. FIG. 7A is a waveform diagram of the output voltage $V_{out}$ wherein the input voltage $V_{in}$ is reduced while the duty cycle adjusting device is not operated. As shown in FIG. 7A, when the input voltage $V_{in}$ is higher than 6V, the buck switching regulator may output the stable output voltage $V_{out}$=5V. When the input voltage $V_{in}$ falls below 6V, the output voltage $V_{out}$ starts to fall in accordance with the input voltage $V_{in}$ and appears to be unstable. In such a situation, the switching frequency $F_s$ and the switching cycle $T_s$ of the switch 108 or the pulse width modulation signal TON can be measured. Before the output voltage $V_{out}$ falls, the switching frequency $F_s$ is 516 kHz, and the switching cycle $T_s$ is 1.94 µs; after the output voltage $V_{out}$ starts to fall, the switching frequency $F_s$ is 513 kHz, and the switching cycle $T_s$ is 1.95 µs. Therefore, when the duty cycle adjusting device is not operated, the switching frequency $F_s$ and the switching cycle $T_s$ do not change substantially, and the buck switching regulator can output the stable output voltage $V_{out}$ until the input voltage $V_{in}$ falls to approximately 6V. When the input voltage $V_{in}$ is lower than 6V, the buck switching regulator may not operate normally.

FIG. 7B is a waveform diagram of the output voltage $V_{out}$ wherein the input voltage $V_{in}$ is reduced while the duty cycle adjusting device is activated according to an embodiment of the present invention. As shown in FIG. 7B, when the input voltage $V_{in}$ is higher than 5.4V, the buck switching regulator can output the stable output voltage $V_{out}$=5V. When the input voltage $V_{in}$ falls below 5.4V, the output voltage $V_{out}$ starts to fall in accordance with the input voltage $V_{in}$ and appears to be unstable. In such a situation, the switching frequency $F_s$ and the switching cycle $T_s$ of the switch 108 or the pulse width modulation signal TON can be measured. Before the input voltage $V_{in}$ falls to 6V, the switching frequency $F_s$ is 511 kHz, and the switching cycle $T_s$ is 1.96 µs; after the input voltage $V_{in}$ falls below 6V, the switching frequency $F_s$ is 211 kHz, and the switching cycle $T_s$ is 4.75 µs. Therefore, when the duty cycle adjusting device is operated, the switching frequency $F_s$ and the switching cycle $T_s$ may change significantly, which infers that the switching cycle $T_s$, the on time T, and the duty cycle D will rise. When the input voltage $V_{in}$ of the buck switching regulator falls to approximately 5.4V, the stable output voltage $V_{out}$=5V may still be output.

In order to illustrate the effects achieved by the duty cycle adjusting device, an output voltage $V_{out1}$ of the buck switching regulator without the duty cycle adjusting device and an output voltage $V_{out2}$ of the buck switching regulator having the duty cycle adjusting device are compared in the same waveform diagram. As shown in FIG. 7C, the output voltage $V_{out1}$ starts to fall when the input voltage $V_{in}$ falls to approximately 6V. In comparison, the output voltage $V_{out2}$ still remains at 5V when the input voltage $V_{in}$ falls to approximately 6V, and it starts to fall after the input voltage $V_{in}$ falls to approximately 5.4V. As a result, the buck switching regulator having the duty cycle adjusting device can still provide a stable output voltage even in a low input voltage (e.g. 5.4V-6V), which increases the adaptive range for the input voltage of the buck switching regulator.

In the prior art, when the input voltage is gradually reduced, the on time of the pulse width modulation signal may increase and the off time will be reduced. If the off time reaches a minimum value while the input voltage still keeps falling, the buck switching regulator may not transmit enough power to the output terminal, such that the output voltage has to fall in accordance with the input voltage for maintaining the system balance. As a result, when the input voltage falls to a lower voltage level, the buck switching regulator may not output the stable output voltage continuously. In comparison, the embodiments of the present invention utilize various types of duty cycle adjusting devices to reduce the switching frequency of the pulse width modulation signal when the off time reaches the minimum value, such that the switching cycle and the on time of the pulse width modulation signal both increase, and the duty cycle of the buck switching regulator rises accordingly. As a result, the buck switching regulator can still provide the stable output voltage under the low input voltage, which increases the adaptive range for the input voltage of the buck switching regulator.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method for preventing an output voltage of a buck switching regulator from falling when an input voltage of the buck switching regulator falls, the control method comprising:
   converting the input voltage into a charging current;
   determining a duty cycle of the buck switching regulator according to the charging current and the output voltage; and
   adjusting a switching frequency of a pulse width modulation signal in the buck switching regulator when the input voltage falls to a specific voltage and an off time of the pulse width modulation signal reaches a minimum value, in order to change the duty cycle to prevent the output voltage from falling.

2. The control method of claim 1, wherein the duty cycle is a ratio of an on time to an off time in a switching cycle when the pulse width modulation signal is switched between the on time and the off time periodically.

3. The control method of claim 2, wherein the step of adjusting the switching frequency of the pulse width modulation signal in the buck switching regulator comprises:
   increasing the on time of the pulse width modulation signal in each switching cycle of the pulse width modulation signal, such that the switching frequency is reduced, in order to change the duty cycle to prevent the output voltage from falling.

4. The control method of claim 1, wherein the step of adjusting the switching frequency of the pulse width modulation signal in the buck switching regulator when the input voltage falls to the specific voltage and the off time of the pulse width modulation signal reaches the minimum value comprises:
   drawing parts of the charging current to reduce the charging current when the input voltage falls to the specific voltage and the off time of the pulse width modulation signal in the buck switching regulator reaches the minimum value, in order to adjust the switching frequency for changing the duty cycle to prevent the output voltage from falling.

5. The control method of claim 1, wherein the step of adjusting the switching frequency of the pulse width modulation signal in the buck switching regulator when the input voltage falls to the specific voltage and the off time of the pulse width modulation signal reaches the minimum value comprises:
   using a variable current source for providing the charging current, and adjusting the variable current source to reduce the charging current when the input voltage falls to the specific voltage and the off time of the pulse width modulation signal in the buck switching regulator reaches the minimum value, in order to adjust the switching frequency for changing the duty cycle to prevent the output voltage from falling.

6. The control method of claim 1, wherein the step of converting the input voltage into the charging current comprises:

multiplying the input voltage by a specific ratio, and utilizing a converting parameter to convert the input voltage after it is multiplied by the specific ratio in order to generate the charging current.

7. The control method of claim 6, wherein the step of adjusting the switching frequency of the pulse width modulation signal in the buck switching regulator when the input voltage falls to the specific voltage and the off time of the pulse width modulation signal reaches the minimum value comprises:

adjusting the converting parameter to reduce the charging current when the input voltage falls to the specific voltage and the off time of the pulse width modulation signal in the buck switching regulator reaches the minimum value, in order to adjust the switching frequency for changing the duty cycle to prevent the output voltage from falling.

8. The control method of claim 6, wherein the step of adjusting the switching frequency of the pulse width modulation signal in the buck switching regulator when the input voltage falls to the specific voltage and the off time of the pulse width modulation signal reaches the minimum value comprises:

adjusting the specific ratio to allow the lower input voltage to be converted by the converting parameter to generate the lower charging current when the input voltage falls to the specific voltage and the off time of the pulse width modulation signal in the buck switching regulator reaches the minimum value, in order to adjust the switching frequency for changing the duty cycle to prevent the output voltage from falling.

9. The control method of claim 1, wherein the step of determining the duty cycle of the buck switching regulator according to the charging current and the output voltage comprises multiplying the output voltage by a specific ratio, and comparing the output voltage after it is multiplied by the specific ratio with the charging current, in order to determine the duty cycle.

10. The control method of claim 9, wherein the step of adjusting the switching frequency of the pulse width modulation signal in the buck switching regulator when the input voltage falls to the specific voltage and the off time of the pulse width modulation signal reaches the minimum value comprises:

adjusting the specific ratio to allow the higher output voltage to be compared with the charging current when the input voltage falls to the specific voltage and the off time of the pulse width modulation signal in the buck switching regulator reaches the minimum value in order to adjust the switching frequency for changing the duty cycle to prevent the output voltage from falling.

11. A control circuit for a buck switching regulator comprising:

a voltage-to-current converter, for converting an input voltage of the buck switching regulator into a charging current;

a current output device, coupled to the voltage-to-current converter, for outputting the charging current;

a capacitor, coupled to the current output device, for storing the charging current;

a switch, coupled to the capacitor, for discharging the capacitor;

a comparing device, coupled to the voltage-to-current converter, for determining a duty cycle of the buck switching regulator according to the charging current and an output voltage of the buck switching regulator; and a duty cycle adjusting device, for adjusting a switching frequency of a pulse width modulation signal in the buck switching regulator when the input voltage falls to a specific voltage and an off time of the pulse width modulation signal reaches a minimum value, in order to change the duty cycle to prevent the output voltage from falling.

12. The control circuit of claim 11, wherein the duty cycle is a ratio of an on time to an off time in a switching cycle when the pulse width modulation signal is switched between the on time and the off time periodically.

13. The control circuit of claim 12, wherein the duty cycle adjusting device increases the on time of the pulse width modulation signal in each switching cycle of the pulse width modulation signal, such that the switching frequency is reduced, in order to change the duty cycle to prevent the output voltage from falling.

14. The control circuit of claim 11, wherein the duty cycle adjusting device is coupled to the current output device, for drawing parts of the charging current outputted by the current output device to reduce the charging current when the input voltage falls to the specific voltage and the off time of the pulse width modulation signal in the buck switching regulator reaches the minimum value, in order to adjust the switching frequency for changing the duty cycle to prevent the output voltage from falling.

15. The control circuit of claim 11, wherein the current output device comprises a variable current source for providing the charging current, and the duty cycle adjusting device adjusts the variable current source to reduce the charging current when the input voltage falls to the specific voltage and the off time of the pulse width modulation signal in the buck switching regulator reaches the minimum value, in order to adjust the switching frequency for changing the duty cycle to prevent the output voltage from falling.

16. The control circuit of claim 11, wherein the voltage-to-current converter multiplies the input voltage by a specific ratio, and converts the input voltage with a converting parameter after it is multiplied by the specific ratio in order to generate the charging current.

17. The control circuit of claim 16, wherein the duty cycle adjusting device is coupled to the voltage-to-current converter, for adjusting the converting parameter to reduce the charging current when the input voltage falls to the specific voltage and the off time of the pulse width modulation signal in the buck switching regulator reaches the minimum value, in order to adjust the switching frequency for changing the duty cycle to prevent the output voltage from falling.

18. The control circuit of claim 16, wherein the duty cycle adjusting device is coupled to the voltage-to-current converter, for adjusting the specific ratio to allow the lower input voltage to be converted by the converting parameter to generate the lower charging current when the input voltage falls to the specific voltage and the off time of the pulse width modulation signal in the buck switching regulator reaches the minimum value, in order to adjust the switching frequency for changing the duty cycle to prevent the output voltage from falling.

19. The control circuit of claim 11, wherein the comparing device multiplies the output voltage by a specific ratio, and compares the output voltage after it is multiplied by the specific ratio with the charging current, in order to determine the duty cycle.

20. The control circuit of claim 19, wherein the duty cycle adjusting device is coupled to the comparing device, for adjusting the specific ratio to allow the higher output voltage to be compared with the charging current when the input voltage falls to the specific voltage and the off time of the pulse width modulation signal in the buck switching regulator reaches the minimum value, in order to adjust the switching frequency for changing the duty cycle to prevent the output voltage from falling.

* * * * *